Aug. 19, 1958 H. N. STEPHAN 2,847,911
HORIZONTAL BORING, DRILLING AND MILLING MACHINE
Filed July 14, 1955 5 Sheets-Sheet 1

INVENTOR
HALLIS N. STEPHAN
BY
ATTORNEYS

Aug. 19, 1958

H. N. STEPHAN 2,847,911

HORIZONTAL BORING, DRILLING AND MILLING MACHINE

Filed July 14, 1955

INVENTOR.
HALLIS N. STEPHAN
BY
ATTORNEYS

Aug. 19, 1958   H. N. STEPHAN   2,847,911
HORIZONTAL BORING, DRILLING AND MILLING MACHINE
Filed July 14, 1955   5 Sheets-Sheet 4

INVENTOR.
HALLIS N. STEPHAN
BY Hudson, Boughton,
Williams, David & Hoffman
ATTORNEYS ツ
United States Patent Office 2,847,911
Patented Aug. 19, 1958

2,847,911

HORIZONTAL BORING, DRILLING, AND MILLING MACHINE

Hallis N. Stephan, Cleveland Heights, Ohio, assignor to The New Britain Machine Company, New Britain, Conn., a corporation of Connecticut Application July 14, 1955, Serial No. 522,065

4 Claims. (Cl. 90—14)

The present invention relates to machine tools and, more particularly, to a machine tool, especially a combined horizontal boring, drilling and milling machine, having variable speed drive means for actuating a movable machine tool element thereof.

The principal object of the present invention is the provision of a new and improved machine tool, particularly a combined horizontal boring, drilling and milling machine, having a tool or work spindle member and compact drive means for rotating the member at one of a plurality of speeds, including a variable speed planetary transmission so constructed and arranged as to provide a wide range of output speeds for any given input speed and be shiftable from one speed to another without interrupting the drive.

Another object of the present invention is the provision of a new and improved machine tool, particularly a combined horizontal boring, drilling and milling machine, having a drive for a rotatable machine tool element or member thereof, such as a tool or work spindle, which drive includes a variable speed transmission adapted to selectively function as a direct drive, a planetary drive or as a combined differential and planetary drive to provide plurality speeds and a large difference between the highest and lowest output speeds of the transmission for any given input speed to the transmission.

Another object of the present invention is the provision of a new and improved machine tool, particularly a combined horizontal boring, drilling and milling machine having a machine tool member or element, particularly a tool or work spindle, to be rotated at one of a plurality of speeds, and drive means for rotating the member or element including a variable speed planetary transmission, comprising a driving member mounted coaxially with the rotatable member or element, a planet or pinion gear, rotatably supported in a carrier member mounted coaxial with the driving member of the transmission and operatively connected to the rotatable member or element to rotate the latter upon rotation of the planet gear carrier, the planet gear carrier also having a planet gear or gears in mesh with an internal gear rotatably supported coaxially about the gear carrier and with an external sun gear rotated by the driving member of the planetary transmission, the internal gear being selectively drivable from the driving member at a speed different than the speed of the driving member, whereby the rotational speed imparted to the member or element to be rotated is a function of the algebraic sum of the rotational speeds of the sun gear and the internal gear.

The invention resides in certain constructions and combinations and arrangement of parts and further objects and advantages of the invention will be apparent to those skilled in the art to which it relates from the following description of the preferred embodiment described with reference to the accompanying drawing, forming a part of this specification, and in which.

Figure 1:
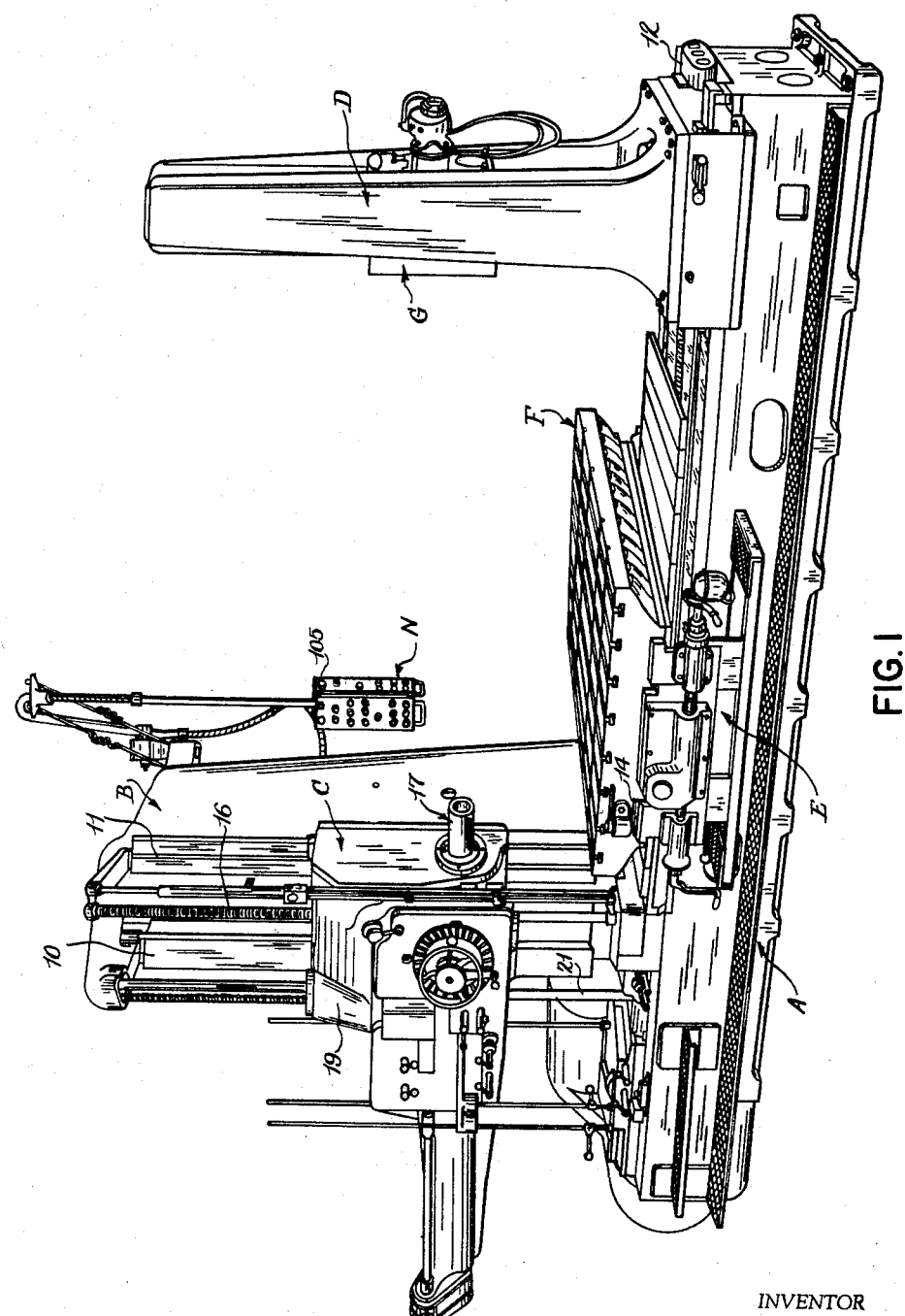
Fig. 1 is a perspective view of a combined horizontal boring, drilling, and milling machine embodying the present invention.
Figure 2:
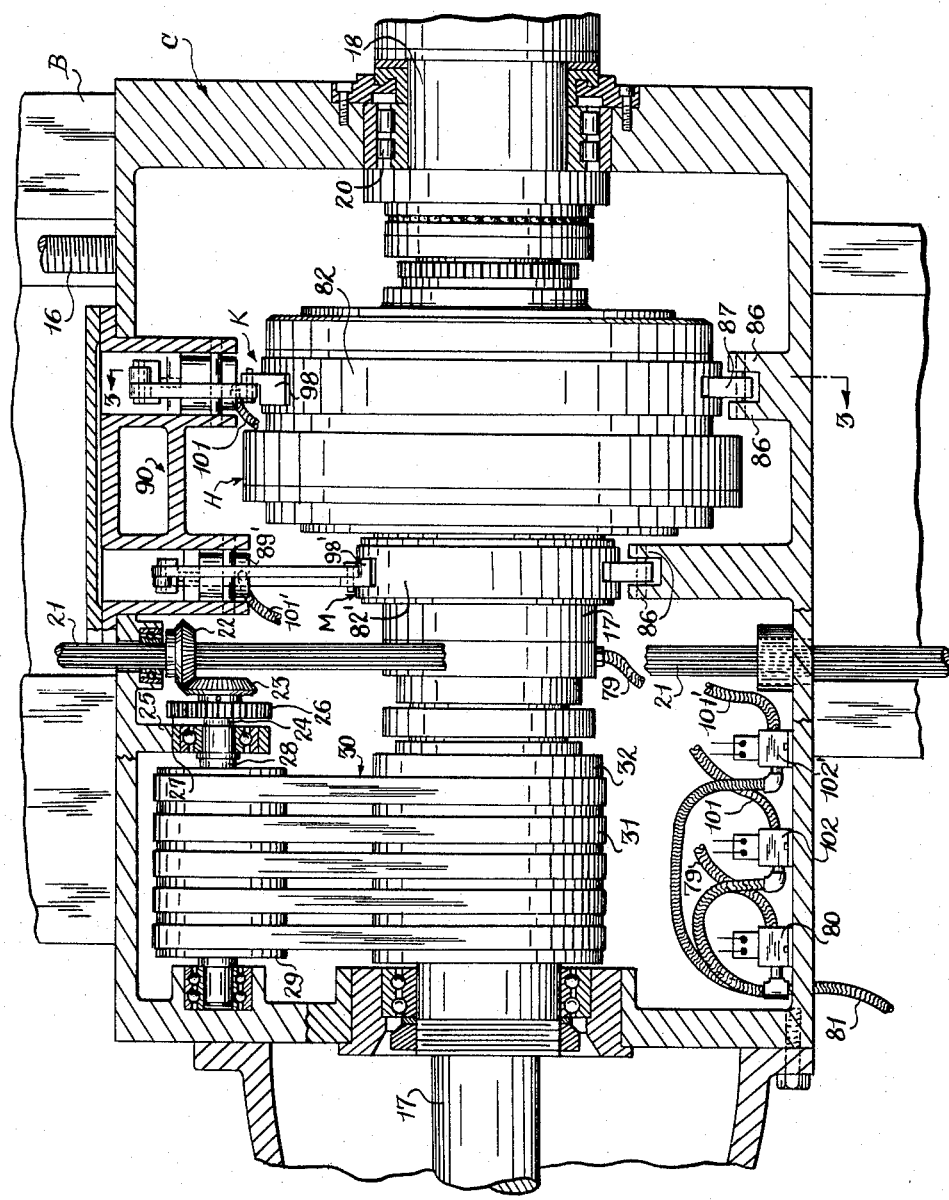
Fig. 2 is a vertical longitudinal sectional view through the spindle head of the machine illustrated in Fig. 1 showing the drive for the tool spindle in elevation.
Figure 3:
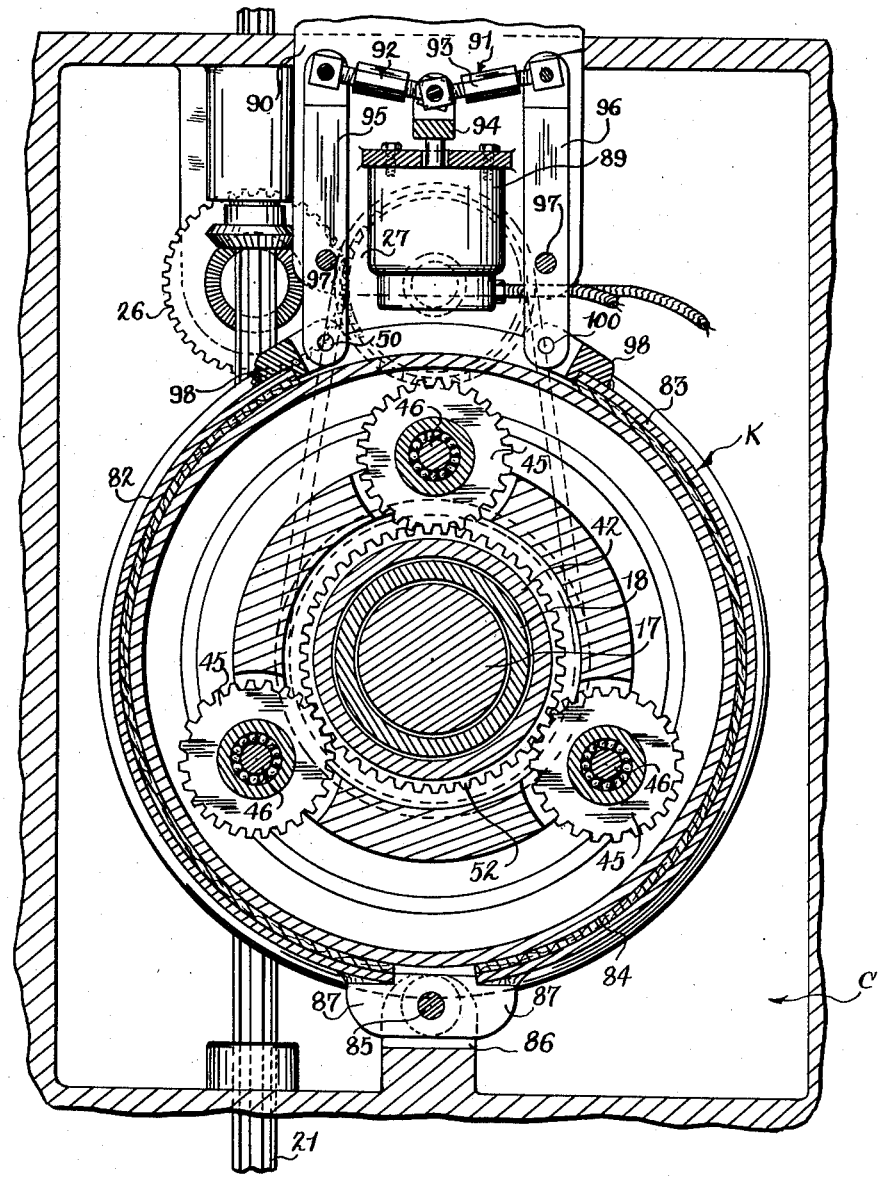
Fig. 3 is a fragmentary vertical sectional view with portions in elevation taken approximately along line 3—3 of Figs. 2 and 4.

While the present invention may be embodied in various types of machines, it is particularly applicable to combined horizontal boring, drilling, and milling machines having a tool spindle to be driven at relatively high and low speeds.

Referring to the drawings, the machine shown therein comprises a base A provided at one end with a spindle head column B having vertical ways 10 and 11 on the front face thereof, upon which ways a spindle head C is mounted for vertical movement. At the other end of the base or bed A, a backrest or outboard support column D is provided. This backrest or outboard support column is slidably supported on horizontal ways 12 formed on the upper side of the bed. The ways 12 also have slidably supported thereon a saddle E, the upper side of which is provided with horizontal ways 14 and 15 which in turn support a work table F. A backrest block G is slidably supported for movement along vertical ways formed on the backrest column.

The spindle head C which is counterbalanced by a weight (not shown) is adapted to be moved vertically along the ways 10 and 11 by a lead screw 16 rotatably supported in the base A and the spindle head column B and having threaded engagement with a nut fixed in the spindle head. A spindle, designated generally by the reference character 17, is keyed within a spindle quill 18 and is rotatable in opposite directions in a manner hereinafter more specifically referred to upon rotation of the spindle quill and is moved in opposite directions longitudinally of its axis and relative to the spindle quill to effect both feeding and rapid traversing movements. The spindle quill 18 is supported at its opposite ends for rotation with respect to the spindle head housing 19 by spaced antifriction bearing means 20. The machine shown is similar to that shown and described in U. S. Patent No. 2,350,174 entitled "Boring Machine" and the means for controlling and moving the different elements of the machine may be the same as disclosed and described in the aforesaid patent except for the changes set out hereinafter.

The spindle 17 is rotated from a vertical spline shaft 21 extending through the spindle head C and rotatably supported at opposite ends by the bed A and the column B. The spline shaft is preferably rotated by a variable speed drive located in the bed A of the machine. The variable speed drive for the spline shaft is not shown in the drawings and will not be described, since, per se, it forms no part of the present invention; however, the drive for the spline shaft may be similar to that shown and described in the aforesaid patent.

According to the preferred embodiment of the present invention the drive from the spline shaft 21 to the spindle 17 includes a bevel gear 22 rotatably supported in the spindle head C and splined on the shaft 21 for vertical movement with the spindle head. The gear 22 is continuously in mesh with a bevel gear 23 fixed to the right hand end of a horizontal shaft 24 rotatably supported by an intermediate wall 25 within the spindle head housing 19. The shaft 24 has a gear 26 fixed thereto which is continuously in mesh with a gear 27 fixed to the right hand end of a shaft 28 rotatably supported in the spindle head housing 19 parallel to the shaft 24. The shaft 28 carries the drive pulley 29 of a belt drive 30, which drive includes a plurality of V-belts 31 and a driven pulley 32 keyed or otherwise fixed to a driving member or sleeve 42 supported coaxially about and rotatable with respect to the spindle quill 18. The driving sleeve 42 is connected to the spindle quill 18 by a planetary transmission H positioned coaxially about the driving sleeve 42 and the spindle quill.

Figure 4:
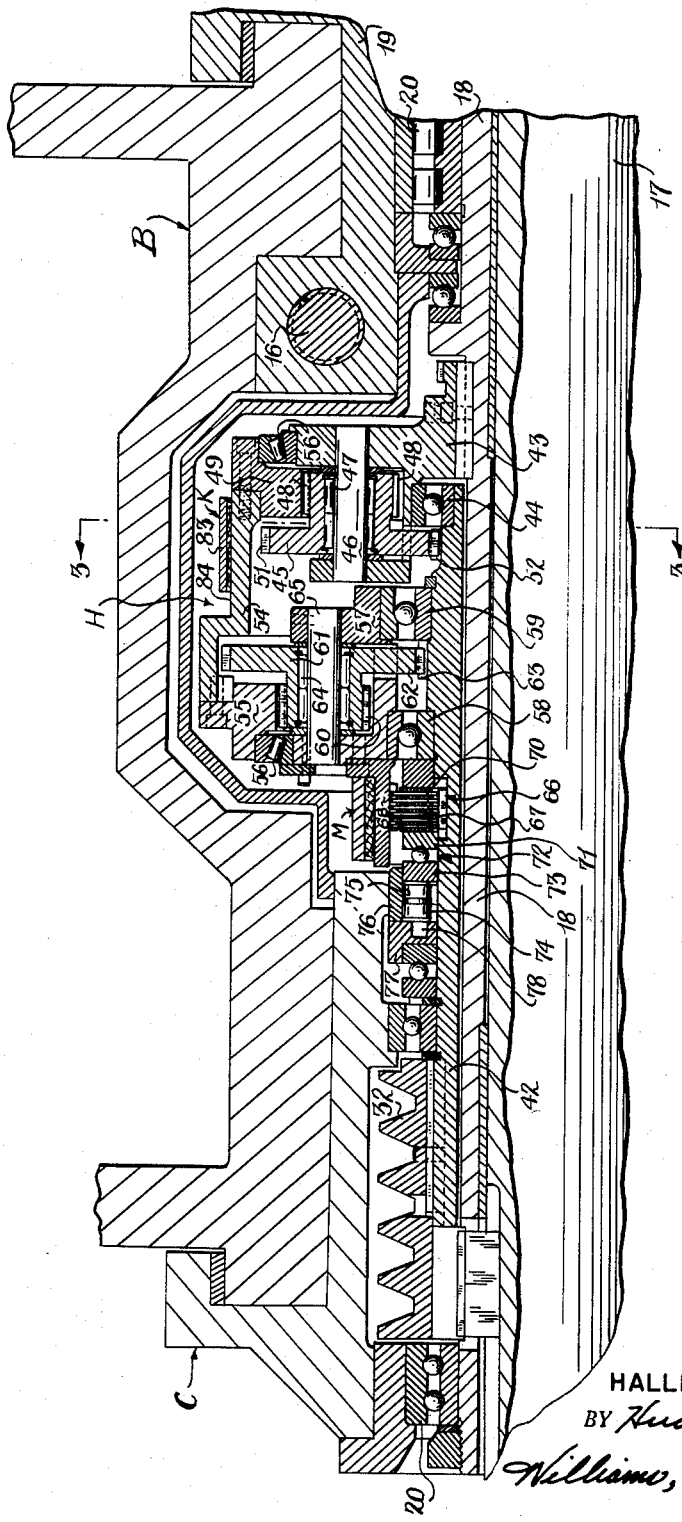
Fig. 4 is a fragmentary horizontal sectional view with portions in elevation through the spindle head.

The planetary transmission H includes a cage-like planet or pinion gear carrier 43 keyed to the spindle quill 18 for rotation therewith. The planet gear carrier, as best shown in Fig. 4, is rotatably supported on the forward end of the driving sleeve 42 by a roller bearing 44 and carries double planet or pinion gears 45, three in the illustrated embodiment, for rotation about the axis of the spindle 17. The double planet gears are equally spaced from each other and are rotatably supported by needle bearings 47 on horizontal shafts 46 fixedly secured in the planet gear carrier.

The double planet gears 45 each comprise an integral smaller planet or pinion gear 48 continuously in mesh with an internal orbit gear 49, and a larger planet or pinion gear 51 continuously in mesh with an external sun gear 52 formed on or fixedly carried by the forward end of the driving sleeve 42.

The internal orbit gear 49 is fixed to the forward end of an annular spacer or member 54 which is coaxial with the spindle axis and carries an internal orbit or ring gear 55, also coaxial with the spindle axis, fixed to the rearward end thereof. The annular member 54 is supported for rotation with respect to the spindle head C by tapered roller bearings 56 positioned at the opposite ends of the member 54, the tapered roller bearing 56 at the right-hand end of the annular member 54 being positioned intermediate a flange on the orbit or ring gear 49 and the planet gear carrier 43 and the tapered roller bearing 56 adjacent the left-hand end of the annular member 54 being positioned between a flange on the internal gear 55 and a cage-like planet gear carrier 57 supported coaxially with the driving sleeve 42 for rotation thereabout by roller bearings 58, 59.

The internal orbit gear 55 is continuously in mesh with smaller planet or pinion gears 60 of three double planet gears 61, only one of which is shown in the drawings but which are symmetrically arranged about the axis of the spindle. In addition to the smaller gears 60, the double planet gears 61 comprise larger planet or pinion gears 62 which are continuously in mesh with a driving gear 63 formed on the driving sleeve 42 intermediate the bearings 58, 59. The double planet gears 61 are supported in cutout portions in the cage 57 by needle bearings 64 for rotation about horizontal shafts 65 fixed in opposite sides of the planetary gear cage 57.

The annular spacer member 54 carrying the internal gears 49, 55 and the planet gear cage 57 are rotatably supported in the manner described with respect to the driving sleeve 42 and the housing of the spindle head C. In the preferred embodiment of the present invention, suitable means are provided to selectively prevent or permit the rotation of either the annular spacer member 54 or the planet gear cage 57, or to cause the planet cage 57 to rotate as a unit with the driving sleeve 42, thereby providing three possible output speeds for each input speed to the transmission.

In the illustrated embodiment a clutch 66 having a plurality of clutch plates 67 is positioned intermediate the inner side of a sleeve 68 detachably connected to and extending rearwardly of the cage 57 and coaxially with the driving sleeve 42. The clutch 66 is selectively operable to permit relative rotation between the planet gear cage 57 and the driving sleeve 42 or to cause them to rotate as a unit. The clutch plates 67 are annular plates coaxial with the spindle axis and are alternately connected to the driving sleeve 42 and the sleeve 68 by keys which permit axial movement of the plates to clutch-engaged and clutch-disengaged positions.

To engage the clutch 66, the clutch plates are clamped against an annular pressure plate 70 immediately adjacent to the bearing 58 by a movable clutch plate 71 which, in the illustrated embodiment, is one race of a thrust bearing 72 which also has a second race 73. The thrust bearing 72 encircles and is axially slidable on the driving sleeve 42 and is adapted to be moved axially along the sleeve 42 to engage the clutch by a plurality of pistons 74, only one of which appears in the drawings, symmetrically arranged about the sleeve 42 and slidably supported in suitable cylinders 75 formed in an annular member 76 fixed in the housing of the spindle head C adjacent to the race 73 of the thrust bearing 72 and having an axial flange overlying a portion of the race 73.

An annular member 77 is connected to the left-hand side of the member 76 and has an annular groove 78 therein opening into the side of the member 77 adjacent to the member 76 and opposite the cylinders 75 for supplying pressure fluid, air in the illustrated embodiment, to the cylinders 75. Air is supplied to the annular groove 78 by a flexible conduit 79 connected to the member 77 and through a solenoid control valve 80 to a flexible conduit 81 leading into the spindle head C. The flexible conduit 81 may be connected to any suitable source of compressed air and the solenoid valve 80 is of the type which is normally in a position connecting the annular groove 78 and in turn the cylinders 75 to atmosphere and which when energized is moved to a position connecting the annular groove 78 and the cylinders 75 to the flexible conduit 81 to supply pressure fluid to the cylinders 75. Upon energization of the control valve 80 to supply pressure fluid to the cylinders 75 the pistons 74 are moved axially to cause engagement of the clutch 66. When the valve 80 is deenergized and the cylinders 75 connected to exhaust, the clutch plates 67 move to a clutch disengaged position. The movement to a clutch-disengaged position may be accomplished by any suitable spring means or by forming the clutch plates in such a manner that they will be inherently resilient and will move to a clutch disengaged position upon release of the clamping pressure.

When the clutch 66 is engaged, the planet gear cage 57 rotates as a unit with the driving sleeve 42 and as long as the annular member 54 is free to rotate, the internal gears 49, 55 will rotate at the same speed as the driving sleeve 42 and the drive from the driving sleeve 42 through the transmission H will be a direct drive and the speed of rotation of the planet gear carrier 43 and, in turn, the spindle quill 18 and the spindle 17 will be the same as the speed of the driving sleeve 42.

To provide a second speed, the clutch 66 is disengaged and the annular member 54 of the transmission H is held against rotation, preferably by brake mechanism K. In the preferred embodiment, the brake mechanism K includes brakeshoes 82, 83 encompassing the outer periphery of the annular member 54 which is formed to provide a brake drum 84. The brake shoes 82, 83 are located on opposite sides of a vertical plane through the axis of the annular member 54 and are pivoted at their lower, adjacent ends to the spindle head C by a pivot pin 85. The pivot pin 85 is supported between spaced ears 86, extending upwardly from the spindle head C and passes through a lug 87 fixed to each of the brake shoes and positioned intermediate the ears.

The brake shoes 82, 83, in the preferred embodiment, are moved about the pivot pin 85 to engage the brake mechanism K by an air motor comprising a cylinder 89 supported above the annular member 54 by a removable bracket 90 and operatively connected to the brake shoes 82, 83 through a toggle mechanism 91. The bracket 90 is removably supported from the sides of an opening in the upper side of the spindle head to permit ready access to the brake mechanism.

The toggle mechanism 91 comprises two toggle arms 92, 93 having their adjacent ends pivotally secured to a piston rod 94, which extends vertically upward from the cylinder 89. The toggle arms 92, 93 are of a turnbuckle construction to permit adjustment of their length and the outer ends thereof are connected, respectively, to levers 95, 96 extending generally vertically in the spindle head housing 19 and pivoted intermediate their ends to the support bracket 90 by pivot pins 97. The lower ends of the levers 95, 96 are, respectively, connected to the upper ends of the brake shoes 82, 83 by yoke members 98. The yoke members 98 are bifurcated to provide spaced arms for supporting pivot pins 100 for connecting the levers 95, 96 to their respective yoke members.

The piston in cylinder 89 is spring biased to a brake released position and to apply the brake K pressure fluid is supplied to the cylinder 89 through a supply line 101 connected to the conduit 81 and including a solenoid valve 102 which valve is spring biased to a normal position connecting the cylinder 89 to exhaust and when energized is moved to a second position connecting the cylinder to the supply line 81. When pressure fluid is supplied to the cylinder 89, the piston therein is moved upwardly against the action of the spring bias to clamp the brake shoes 82, 83 against the brake drum 84, thereby preventing rotation of the annular member 54. By preventing rotation of the annular member 54 while the planet gear cage 57 is free to rotate, the drive from the driving sleeve 42 through the transmission H to the spindle quill 18 is in the nature of a regular planetary drive through the double planet gears 45. This provides a second output speed from the transmission for a given input speed. The following formula may be used to compute the second output speed of the illustrated transmission for any given input speed:

$$R.P.M._{18} = \frac{N_{52} \times N_{48}}{N_{52} \times N_{48} + N_{51} \times N_{49}} R.P.M._{42}$$

where $N_{48}$, $N_{49}$, $N_{51}$ and $N_{52}$ are the number of teeth on the gears 48, 49, 51 and 52, respectively, and $R.P.M._{18}$ and $R.P.M._{42}$ are the number of revolutions of the spindle quill 18 and the driving sleeve 42, respectively.

A third speed for the transmission is provided by preventing rotation of the planet gear cage 57 and permitting rotation of the annular member 54. The rotation of the planet gear cage 57 is prevented, in the illustrated embodiment, by a brake mechanism M adapted to engage the outer periphery of the sleeve 68. The brake mechanism M and the controls therefor are similar in construction and arrangement to the brake mechanism K and the controls therefor and will not be shown or described in detail. The parts of the brake mechanism M have been given the same numerals as the corresponding parts of brake mechanism K with a prime mark (') affixed thereto and suffice it to say that the brake mechanism M is engaged to prevent the rotation of the planet gear cage 57 with respect to the spindle head housing and is disengaged to allow the gear cage 57 to rotate with respect to the spindle head housing.

With the brake M engaged, the planet gear cage 57 cannot rotate, and rotation of the driving sleeve 42 will, therefore, cause the double planet gears 61 to rotate, which in turn causes rotation of the annular member 54 and the internal gear 49. Rotation of the internal gear 49 imparts a first rotational component to the double planet gears 45 by reason of the meshing engagement of the internal gear 49 and the pinion gear 48. A second rotational component is simultaneously imparted to the double planet gears 45 by reason of the meshing engagement of the larger pinion gears 51 of the double planet gears 45 with the external gear 52 on the driving sleeve 42. A rotational movement, therefore, is imparted to the planet gear carrier 43, which is a function of the algebraic sum of the rotational components imparted to the planet gear carrier by the internal gear 49 and the driving gear 52.

The speed of rotation of the spindle 17 for a given speed of rotation of the driving sleeve 42 when the brake M is engaged and the brake K disengaged may be computed from the following formula:

$$R.P.M._{18} = R.P.M._{42} \left( \frac{N_{52} \times N_{48}}{N_{52} \times N_{48} + N_{51} \times N_{49}} - \frac{N_{63} \times N_{60} \times N_{51} \times N_{49}}{N_{62} \times N_{55}(N_{51} \times N_{49} + N_{52} \times N_{48})} \right)$$

where $N_{48}$, $N_{49}$, $N_{51}$, $N_{52}$, $N_{60}$, $N_{62}$, and $N_{63}$ are the numbers of teeth on the gears 48, 49, 51, 52, 60, 61, and 62 respectively, and $R.P.M._{18}$ and $R.P.M._{42}$ are the speeds of rotation of the spindle quill and the driving sleeve respectively.

Preferably, the planet gear carrier 43 has a gear 104 formed on the forward end thereof which constitutes the driving gear of drive means for feeding the spindle axially of its length. The drive from the gear 104 to the spindle may be similar to that shown in the above mentioned patent.

The illustrated embodiment of the present invention utilizes double planet gears in the planetary transmission and brakes for selectively preventing the rotation of certain of elements of the transmission. As will be understood by those skilled in the art, the use of double planet gears permits the size of the transmission to be maintained at a minimum while obtaining relatively large gear ratios and that in applications where space is not at a premium, single planet or pinion gears may prove satisfactory. It will also be understood that any suitable mechanism for preventing rotation of the internal gears 49, 55 and the gear cage 57 may be substituted for the brake mechanisms shown.

The operation of the planetary transmission H is, in the illustrated embodiment, controlled by a selector switch 105 on a pendant control station N for the machine. The pendant control station N may be the same as the pendant control station described in the aforesaid patent with the addition of the switch 105. The selector switch 105 is a three-position switch, each position corresponding to a different speed of the transmission H.

Figure 5:
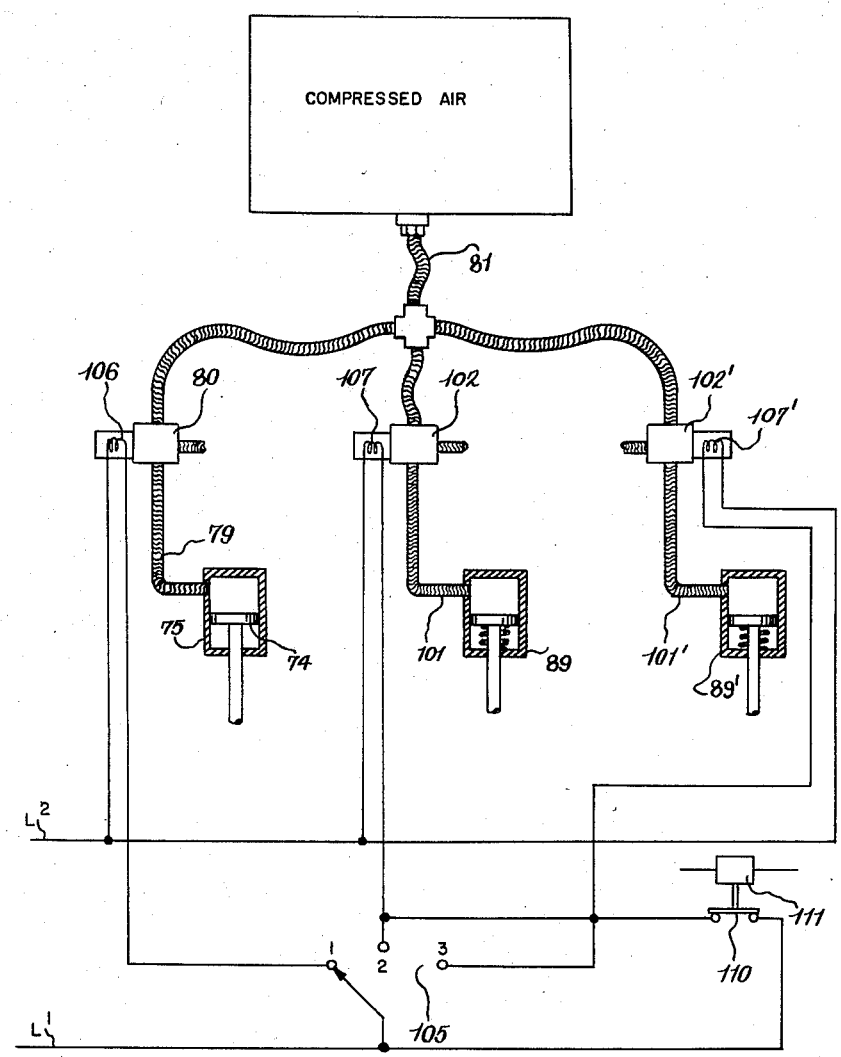
Fig. 5 is a simplified diagrammatic showing of the hydraulic and electrical controls for the drive for the tool spindle.

Referring to the schematic diagram of Fig. 5, when the selector switch 105 is in its first position, it completes a circuit from $L^1$ to $L^2$ through a solenoid 106 for operating the control valve 80. As described above, upon energization of the solenoid for the control valve 80, pressure fluid is supplied from the conduit 81 to the cylinder 75 to operate the piston 64 and engage the clutch 66. With the clutch 66 engaged, the planetary transmission operates as a direct drive, as hereinbefore described, and the output rotational speed of the transmission is the same as the input rotational speed.

When the selector switch 105 is moved to its second position, the solenoid 106 is deenergized and a solenoid 107 for operating the valve 102 is energized by reason of a circuit completed by the switch 105 from $L^1$ to $L^2$ through a solenoid 107 for the control valve 102. As described above, energization of the solenoid for the control valve 102 connects the cylinder 89 to the supply line 81 and causes the application of the brake mechanism K.

The selector switch 105 is moved from its second position to its third position, the solenoid 107 is deenergized and a circuit is completed for energizing a solenoid 107' for operating the control valve 102'. When the solenoid 107' is energized, the valve 102' is in position to connect the cylinder 89' to the supply conduit 81, causing the application of the brake mechanism M.

An advantage of a transmission embodying the present invention is that it is possible to use the brakes K and M to hold or brake the spindle against rotation when the main motor, not shown, for driving the spindle is deenergized or disconnected from the spindle. In the control circuit of Fig. 5, the solenoids 107, 107' are shown as also connected to L¹ through normally closed contacts 110 of a relay 111, the contacts 110 being connected in parallel with the contacts of the switch 105 for selectively energizing solenoids 107, 107'. The relay 111 is connected into the electrical circuit of the machine so that when the main driving motor is energized, the contacts 110 are opened, permitting the switch 105 to control the operation of the solenoids 107, 107', but when the main driving motor is deenergized, the relay 111 is deenergized, closing its contacts 110 to cause the energization of the solenoids 107, 107', irrespective of the switch 105. The energization of the solenoids 107, 107' will cause the application of brakes K and M and will prevent rotation of the rotatable parts of the transmission H and, in turn, the rotation of the spindle 17.

In the illustrated and preferred embodiment, the transmission H, in effect, comprises a double planetary transmission including first and second planetary gear means coaxial with the spindle 17, the first planetary gear means comprising a driving element, the gear 52, driven by the sleeve 42; a driven element, the pinion gears 45 and carrier 43; and a reaction element, the internal gear 49, which may be selectively rotated in either direction by the second planetary gear means. The second planetary gear means includes a driving element, the gear 63, rotated by the sleeve 42; a driven element, which during low speed operation is the internal gear 55 that is connected to the reaction element of the first planetary gear means, and a reaction element, which during low speed operation is the planet pinion 61 and the carrier 57. It will be understood by those skilled in the art that the gear ratio obtained may be varied by causing different elements of the planetary gear means to function as the reaction elements, driving elements, and driven elements, respectively.

From the foregoing, it can be seen that the present invention provides a new and improved machine tool having a movable machine tool element, particularly a tool or work spindle, driven by power actuated drive means, which drive means includes a variable speed planetary transmission so constructed and arranged that a wide speed range may be obtained at the output of the transmission for a given input speed. The transmission provided is especially suitable for use in a combined horizontal boring, drilling and milling machine for rotating the tool spindle thereof, inasmuch as the transmission is a compact heavy duty variable speed transmission which can be shifted without stopping the drive and which is adapted to provide both high and low spindle speeds as well as a balanced drive to the spindle for all speeds.

While the preferred embodiment of the present invention has been described in considerable detail, it will be apparent that the invention is not limited to the construction shown and it is my intention to cover hereby all adaptations, modifications and changes therein which come within the practice of those skilled in the art to which the invention relates and the scope of the appended claims.

Having thus described my invention, I claim:

1. In a machine tool, a movable spindle head frame, a spindle drive member supported in said frame for rotation with respect to said frame, a spindle to be driven in one direction at high, intermediate and low angular speeds and positioned coaxially within said spindle drive member and slidably connected thereto to rotate therewith, a driving sleeve coaxial with said spindle and rotatable with respect thereto, a belt drive connected to said driving sleeve for effecting rotation of said driving sleeve at said high angular speed of said spindle, an external sun gear coaxial with and carried by said driving sleeve for rotation therewith, an internal gear rotatable with respect to said frame and positioned coaxially with respect to said sun gear, a planetary pinion gear member having teeth continuously in mesh with said internal gear and said sun gear rotatably supported by said spindle drive member, said gear member being movable about said internal gear and about the axis of said first gear upon rotation of said spindle drive member, brake means for selectively preventing rotation of said internal gear, gear means driven from said driving sleeve for selectively rotating said internal gear with respect to said frame simultaneously with the rotation of said driving sleeve and at a speed to provide a reaction force for said planetary pinion gear member to drive said planetary pinion gear member and spindle drive member in the same direction as said driving sleeve, and means for selectively effecting rotation of said gear means and said internal gear as a unit with said driving sleeve.

2. In a machine tool, a movable spindle head frame, a tool spindle to be selectively driven in one direction at high, intermediate and low angular speeds, means supporting said spindle in said frame for rotation with respect to said frame, a spindle drive member positioned coaxially about said spindle and connected thereto to rotate said spindle upon rotation of the member, a driving sleeve coaxial with said spindle and rotatable with respect thereto, power actuated means for rotating said driving sleeve at an angular speed equal to the said high angular speed of said spindle, a first external sun gear coaxial with said driving sleeve and connected thereto for rotation therewith, internal gear means coaxial with said first sun external gear, a first pinion gear member having teeth continuously in mesh with said internal gear means and said first external gear and rotatably supported by said spindle drive member, said first pinion gear member moving about said first external gear and said internal gear means upon rotation of said spindle drive member, means for selectively preventing rotation of said internal gear means, a second external gear connected to and rotatable with said driving sleeve, a second pinion gear member having gear teeth continuously in mesh with said second external gear and said internal gear means, a carrier rotatably supporting said second pinion gear member and rotatable with respect to said frame to move said second pinion gear member about said second external gear while in mesh therewith and while in mesh with said internal gear means, means for selectively connecting said driving sleeve and said carrier for rotation as a unit, and means for selectively preventing rotation of said carrier with respect to said frame, said second external gear and said second pinion gear member effecting a driving of said internal gear means when said carrier is held against rotation and said internal gear means is rotatable with respect to said frame at a speed to provide a reaction force to drive said first pinion gear member and said spindle drive member in the same direction as said driving sleeve.

3. In a machine tool, a spindle head frame, a tool spindle supported for rotation with respect to said frame, a spindle drive member coaxial with said spindle and connected thereto to rotate said spindle upon rotation of the member, a driving sleeve coaxial with said spindle and rotatable with respect thereto, power actuated means for rotating said driving sleeve, a first external sun gear coaxial with said driving sleeve and connected thereto for rotation therewith, a first internal gear coaxial with said first sun external gear, a first pinion gear member having teeth continuously in mesh with said internal gear and said first external gear and rotatably supported by said spindle drive member, said first pinion gear member moving about said first external gear and said internal gear upon rotation of said spindle drive member, means for selectively preventing rotation of said first internal gear, a second external gear connected to and rotatable with said driving sleeve, a second internal gear positioned coaxially about said second gear and connected to said first internal gear for rotation therewith, a second pinion gear member having gear teeth continuously in mesh with said second external gear and said internal gear, a carrier rotatably supporting said second pinion gear member and rotatable with respect to said frame to move said second pinion gear member about said second external gear while in mesh therewith and while in mesh with said second internal gear, and means for selectively connecting and disconnecting said carrier and said driving sleeve for rotation as a unit.

4. In a machine tool, a movable frame, a spindle drive member supported by said frame for rotation with respect thereto, a tool spindle to be driven in one direction at high intermediate and low angular speeds and slidably supported within said spindle drive member and connected thereto to rotate therewith, a driving sleeve positioned coaxially about said spindle and rotatable relative thereto and relative to said frame, a belt drive connected to said driving sleeve for rotating the driving sleeve at the high angular speed of said spindle, a first external sun gear coaxial with said driving sleeve and rotatable therewith, internal gear means coaxial with said first external sun gear, a plurality of first compound pinion gear members equally spaced from each other about said first external sun gear and rotatably supported by said spindle drive member and having first gear teeth continuously in mesh with said first external sun gear and second gear teeth continuously in mesh with said internal gear means, a second external sun gear connected to and rotatable with said driving sleeve, a plurality of second compound pinion gear members equally spaced about said second external sun gear and having first gear teeth continuously in mesh with said external sun gear and second gear teeth in mesh with said internal gear means, a carrier member rotatably supporting said second pinion gear members and rotatable with respect to said frame to move said second pinion gear members about said second external sun gear, brake means for selectively preventing rotation of said carrier member with respect to said frame, a clutch having clutch plates coaxial with said driving sleeve and said carrier member for selectively interconnecting said sleeve and said carrier member for rotation as a unit, and brake means for selectively preventing rotation of said internal gear means, said second external sun gear and said second compound pinion gear members effecting rotation of said internal gear means when the brake means for said carrier is engaged and the brake means for said internal gear means released at a speed to provide a reaction force to move said first compound pinion gear members in the same direction with respect to said frame as said driving sleeve.

References Cited in the file of this patent
UNITED STATES PATENTS

| | | |
|---|---|---|
| 825,438 | Wilkinson | July 10, 1906 |
| 1,974,660 | Sinclair | Sept. 25, 1934 |
| 2,721,487 | Morey et al. | Oct. 25, 1955 |